United States Patent [19]

Philipp-Buterowe et al.

[11] Patent Number: 4,979,077

[45] Date of Patent: Dec. 18, 1990

[54] BOWL-SHAPED REFLECTOR FOR A VEHICLE HEADLIGHT

[75] Inventors: Wolfgang Philipp-Buterowe, Hamm; Franz-Josef Kalze, Harsewinkel, both of Fed. Rep. of Germany

[73] Assignee: Hella KG Hueck & Co., Lippstadt, Fed. Rep. of Germany

[21] Appl. No.: 426,442

[22] Filed: Oct. 25, 1989

[30] Foreign Application Priority Data

Oct. 26, 1988 [DE] Fed. Rep. of Germany ....... 3836382

[51] Int. Cl.[5] ................ B60Q 1/04

[52] U.S. Cl. ................ 362/61; 362/346; 362/348; 362/349; 362/350

[58] Field of Search ................ 362/61, 80, 346, 348, 362/349, 350, 347, 290, 296, 297, 301, 341

[56] References Cited

U.S. PATENT DOCUMENTS

| | | | |
|---|---|---|---|
| 1,591,190 | 7/1926 | Stair | 362/348 |
| 1,737,027 | 11/1929 | Schoonmaker | 362/348 |
| 3,401,258 | 9/1968 | Guth | 362/349 |
| 4,351,018 | 9/1982 | Frattz | 362/346 |
| 4,794,504 | 12/1988 | Creff | 362/348 |

FOREIGN PATENT DOCUMENTS 2826087 1/1979 Fed. Rep. of Germany .

*Primary Examiner*—Stephen F. Husar
*Assistant Examiner*—D. M. Cox
*Attorney, Agent, or Firm*—Griffin Branigan & Butler

[57] ABSTRACT

A bowl-shaped reflector for a vehicle headlight produced by a casting process has a flattened section which extends to its outer edge. Grovoes are formed on an interior side of the flattened section which are elongated substantially in the direction of an optical axis of the headlight. The breadth and depth dimensions of the grooves are related to one another, and side surfaces defining the grooves have surface shapes such that, light rays falling directly in the grooves from a dimlight filament of a bulb mounted in the reflector are reflected a plurality of times on wall surfaces defining the grooves.

14 Claims, 3 Drawing Sheets

BOWL-SHAPED REFLECTOR FOR A VEHICLE HEADLIGHT

BRIEF DESCRIPTION OF THE INVENTION

The invention relates to a reflector for a vehicle headlight produced by a casting process which has at least one flattened section extending to an outer rim or edge of the reflector with an interior surface layer on whose surface light rays given off by a light-filament of a light bulb mounted on the reflector are reflected in a scattered manner.

Such a reflector for a vehicle headlight is disclosed in German Offenlegungsschrift 28 26 087. The reflector constructed of resinous plastic of this patent document has upper and lower flattened sections so as to define a somewhat rectangular light exit opening. The surface layers of the interior sides of the flattened sections have multi-faceted surfaces which, when viewed from a direction opposite to the direction of most light exiting the headlight, display a back taper. When a bulb in such a reflector is turned off, the surface layer appears to be shiny, or highly polished, to an observer peering into the reflector in the same manner as other reflector surfaces because most of the light rays falling on the surface layer from outside the reflector experience a simple reflection in the same manner as light rays falling on other reflection surfaces of the reflector. However, adjustable tool, or form, parts are necessary in order to remove such reflector layers from forms because of the backwardly-tapered facets. If a screen under a dim-beam filament of such a headlight slips or is removed, for example in a reflector in which the entire reflection surface is used for a dim-beam light, a light beam from the filament falls directly on the normally screened surface layer and is scattered out of the headlight after a simple reflection from a diverting surface of the facets. Also, in such scattering, the light intensity from such a light beam is so large that opposite traveling traffic is thereby blinded or, during snow, fog, or rain, the driver of the car with such a headlight is himself thereby blinded.

It is an object of this invention to provide a generic reflector having a reflector surface layer on a flattened section thereof in which the surface layer can be removed from a casting form without the use of adjustable tools.

Further, it is an object of this invention to provide such a reflecting surface layer for a flattened section of a reflector which reduces the light intensity of rays falling directly thereon from a dim-light filament so that neither opposite traffic nor the driver of the car with the headlight are disturbingly blinded by such reflections.

Further, it is an object of the invention to provide such a reflector for which light rays falling on the reflection surface layer of the flattened section are so reflected that when the headlight is turned off, the reflection surface of the flattened area appears to be shiny and reflective.

SUMMARY OF THE INVENTION

According to principles of this invention, grooves are arranged on an interior side of a flattened section, of a headlight reflector, the grooves being elongated in approximately the direction of an optical axis of the headlight, with the breadth and depth of the grooves having such a relationship one to another, and with side surfaces defining the grooves being arranged such that, at least a portion of light rays from a dim-light filament of a bulb mounted in the reflector falling directly in the grooves is reflected a plurality of times from wall surfaces of the grooves. In this regard, it is particularly useful when the portion of light rays from the dim-light filament falling in the grooves is reflected a plurality of times by the side surfaces as well as bottom surfaces defining the grooves. With this arrangement, a surface layer appears to be highly polished, or shiny, since an observer sees the bottom surfaces of the inventive grooves from all observing angles. Those light rays falling in the grooves from the dim-light filament have a reduced intensity from the many reflections on the wall surfaces of the grooves. This reduction is increased by increasing the number of reflections of the light rays from the wall surfaces, reducing light intensity with each reflection by about 10%.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE INVENTION

A reflector 1 is cast of resinous plastic and defines a rectangularly-shaped light-exit opening by means of upper and lower flattened sections 2 and 3. An exit-surrounding rim is provided with a flange 4 which serves to receive a transparent light shield (not shown). At an apex of the reflector, there is an opening 5 for receiving a dash-dot "strichpunktierten," light bulb.

Figure 1:
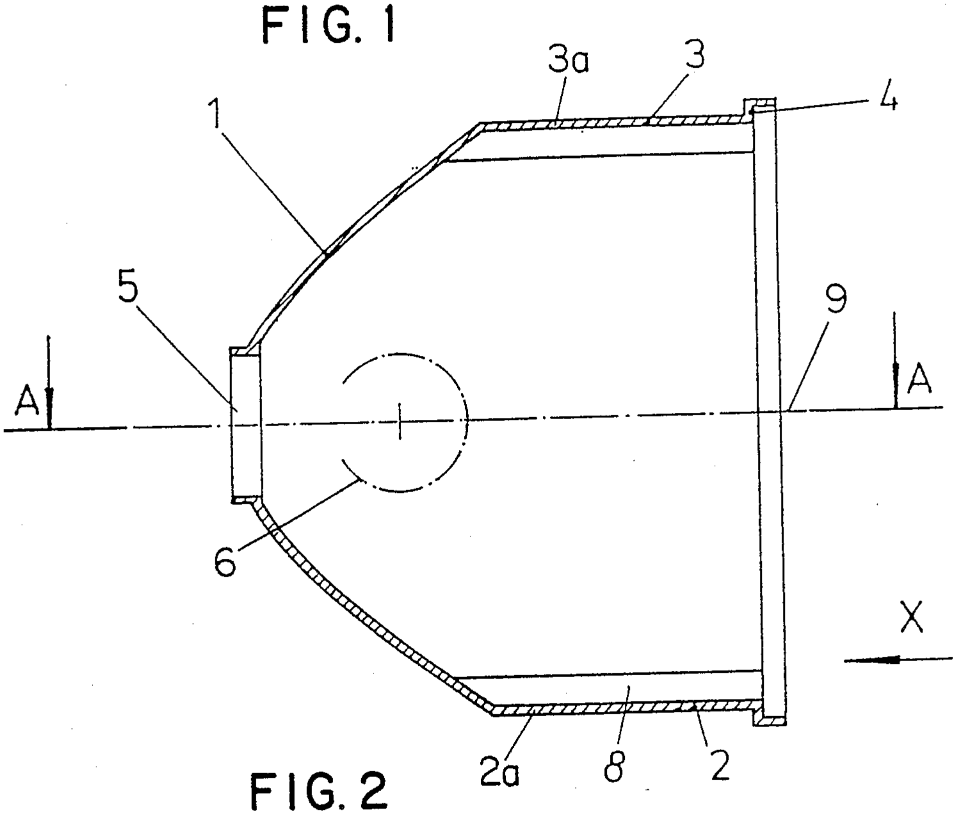
FIG. 1 is a cross-sectional view taken on a middle vertical plane passing through a reflector of a vehicle headlight having a rectangular light-exit opening according to principles of this invention.
Figure 2:
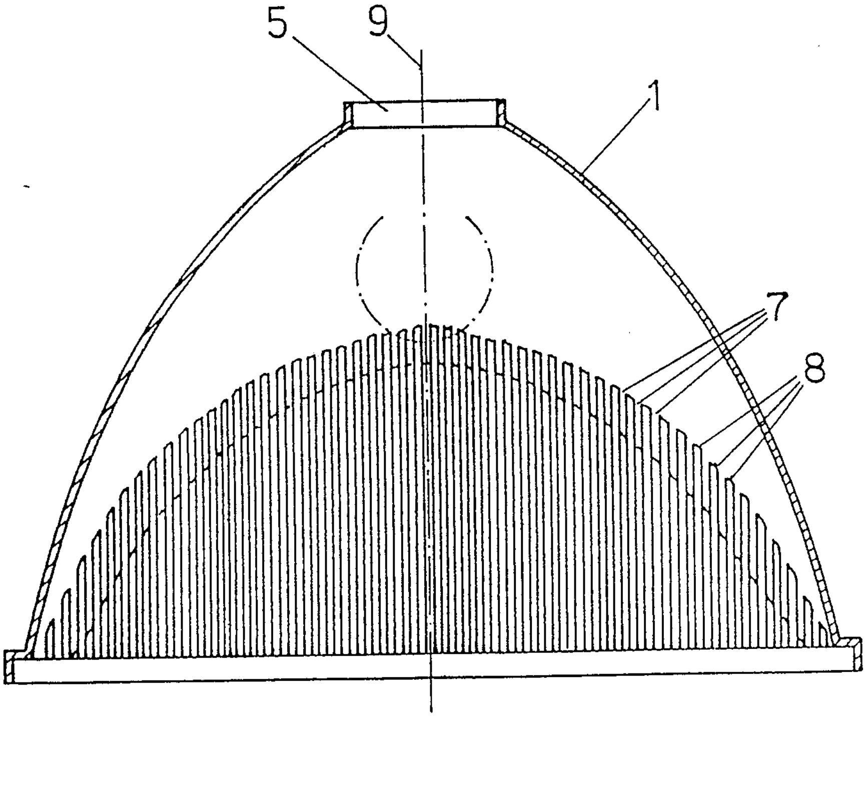
FIG. 2 is a cross-sectional view taken on line A—A in FIG. 1.
Figure 3:
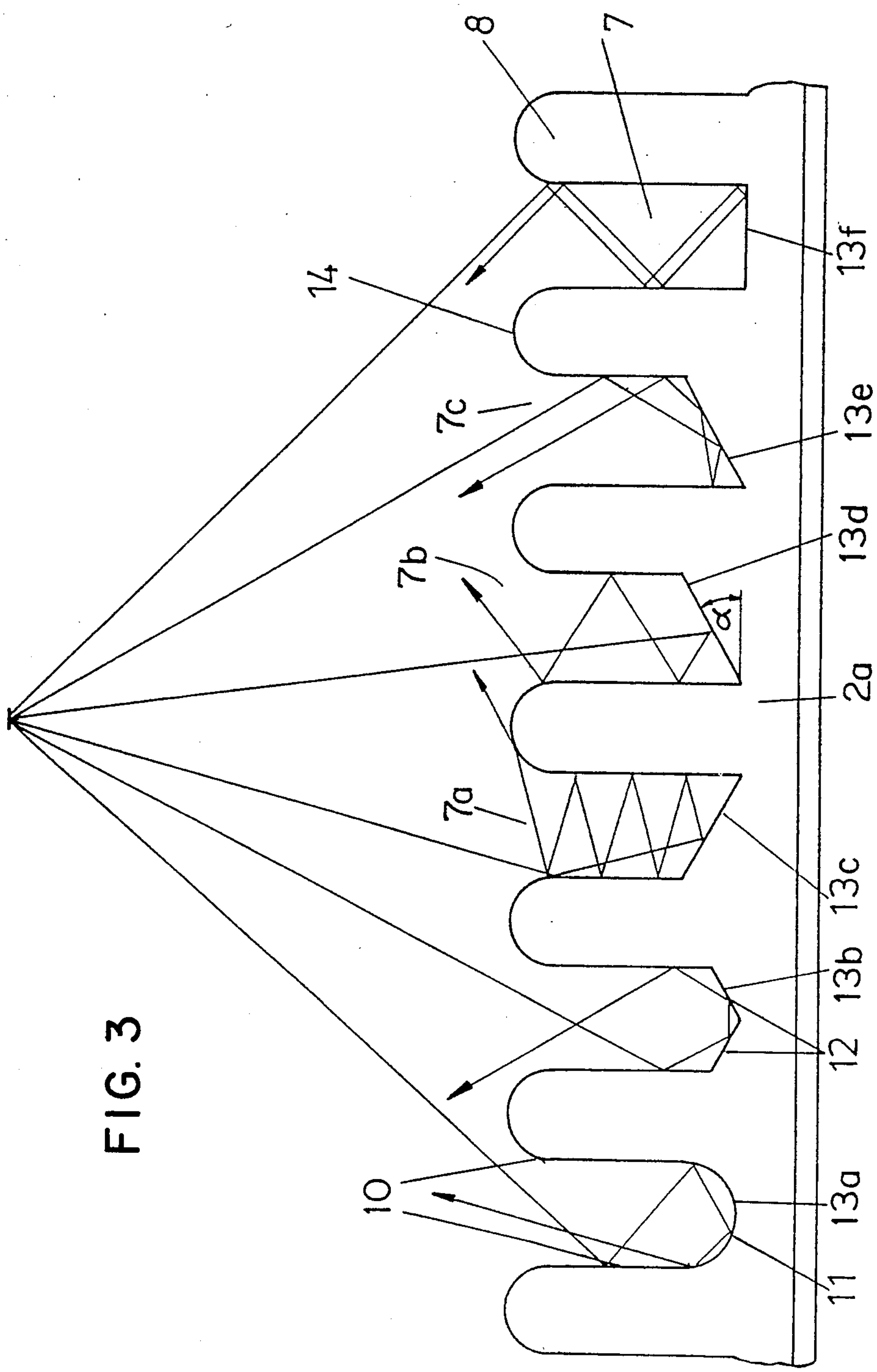
FIG. 3 is a view taken from the direction X in FIG. 1 of grooves in a lower flattened section of the reflector, schematically showing various forms such grooves can have.

Grooves 7 are arranged on interior surfaces of the flattened sections 2 and 3. These grooves are defined by and separated from one another by permanent ribs 8 on approximately-flat main bodies 2*a* and 3*a* of the flattened sections 2 and 3. The grooves 7 and the ribs 8 are elongated approximately parallel to an optical axis 9 of the reflector 1. The ribs 8 are as thin as it is technically possible to make them with tools, especially molding tools. All of true grooves shown in FIG. 3 display side surfaces 10 which are parallel to one another. Bottom surfaces 13 *a–f* of the grooves 7 are, however, in most cases of the thusly represented grooves of FIG. 3, shown to have various forms. In two of the grooves, the bottom surfaces 13*a* and 13*b* are shown to be concave in cross-section. In one of these cases, the concave form is created by a circularly curved surface 11 and in the other case, it is created by flat surfaces 12 which are arranged one to the other in the shape of a V. Three of the grooves *7a*, *7b* and *7c* have flat bottom surfaces 13*c, d* and *e* which extend to form pointed, or acute angles $\alpha$ with the flat main body of the flattened section 2. The angles $\alpha$ can be of various sizes. An angles $\alpha$ of an optimal size when light rays falling on the bottom surface, after their reflection therefrom, are reflected as many times as possible on side surfaces 10 defining the grooves. Still further, a groove is depicted in FIG. 3 whose bottom surface 13*f* is parallel to the flat main body 2*a* of the flattened section 2. Outer apex surfaces 14 of the ribs 8 have a circularly curved shape.

Figure 4:
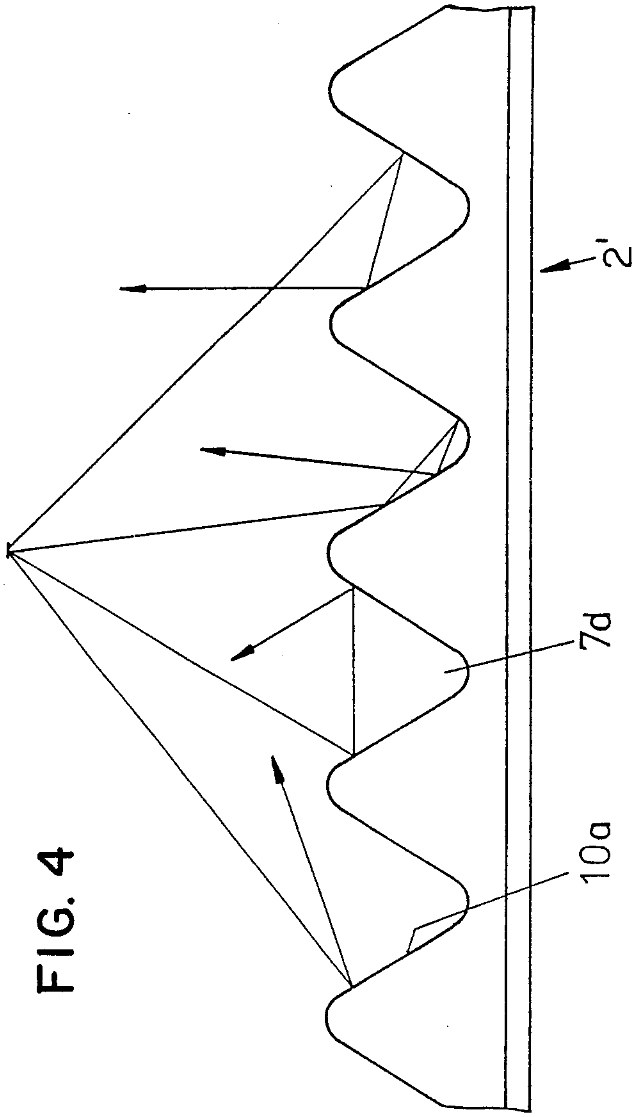
FIG. 4 is a view taken from the direction X of FIG. 1 showing grooves of a lower flattened section of a reflector in an embodiment in which the grooves are V-shaped.

FIG. 4 depicts an embodiment of the flattened section 2′ of the reflector 1 in which the grooves *7d* are V-formed, with side surfaces 10*a* reflecting a plurality of times light rays falling in the grooves.

In embodiments of the invention in which bottom surfaces of the grooves are concave in cross-section, either forming circular curves or having flat surfaces arranged relative to one another to produce a V-form, all of the grooves in a flattened section can have the same shape since substantially even all those light rays falling directly on the bottom surfaces are reflected toward side surfaces.

Moreover, when all of the grooves of the flattened section have the same shape, it is only necessary to use one particularly shaped milling cutter on a mold forming tool, or, on a mold, in the area of the grooves.

In an embodiment of the invention in which the bottom surfaces extend to form pointed, or acute, angles $\alpha$ with the main body 2*a* of a flattened sections, it is beneficial to have these angles $\alpha$ open, or acute, in a direction toward the nearest side edge of the flattened section, that is, away from a center line of the flattened section parallel to the optical axis. Such an arrangement is particularly beneficial for those grooves lying in the middle portion of the flattened section because many light rays fall directly on the bottom surfaces of these grooves, or fall thereon after only one reflection from a side surface, and these are reflected toward side surfaces of the grooves. The larger the angle of the bottom surface of the grooves to the main body of the flattened section, the more the incoming light rays will be reflected on the side surfaces, up to a point.

In a particularly beneficial embodiment of a reflector of this invention, the bottom surfaces of the grooves in a middle portion of the flattened section are formed by flat surfaces forming a pointed, or acute angle $\alpha$ with the main body of the flattened section while at side portions of the flattened section, the grooves are concave in cross-section. The form of the bottom surfaces of the grooves in the middle portion and in the side portions of the flattened section are in this embodiment different because the amount of light falling in the grooves in the middle portion of the flattened section is substantially greater than that falling in the grooves of the side portions of the flattened section. Moreover, it is beneficial when the bottom surfaces lie approximately in the same plane. In this manner, it is possible to easily and quickly achieve optimally arranged bottom surfaces for entering light rays.

It is beneficial to define the grooves by ribs formed on the flattened sections. These ribs should be as thin as it is possible to carry this out with forming, or molding tools.

It is further beneficial when the outer apex surfaces of the ribs are concave in shape, defining circular curves in cross-section. In this manner, light rays falling on these apex surfaces will be scattered and many of them will fall in adjacent grooves.

It is further beneficial when the grooves are at least as deep as they are wide and it is particularly beneficial when the ratio of the depth to the breadth or width, of the grooves is around 2:1.

In the same manner, it is beneficial for the side surfaces of the grooves to be approximately parallel to one another. Such grooves cannot only be manufactured cost effectively, but light rays falling in the grooves will also be reflected many times between the side surfaces thereof.

In addition, it is beneficial to have grooves of a flattened section with various different shapes. This can be carried out to an extent that every groove has a different shape.

The embodiments of the invention in which an exclusive property or privilege are claimed are defined as follows:

1. In a bowl-shaped reflector for a vehicle headlight produced by a casting process having at least one flattened section whose interior side is provided with a surface on which light rays given off by a filament of a light bulb mounted in the reflector fall and are reflected in a scattered manner, the improvement wherein:

the interior side of the flattened section has grooves therein defined by reflecting surfaces, said grooves being elongated substantially in a direction of an optical axis of the bowl-shaped reflector, being at least as deep as they are wide, and being defined by side surfaces which extend approximately parallel to one another, such that at least a portion of light rays falling in the grooves from the filament is reflected a plurality of times on wall surfaces forming the grooves.

2. A reflector as in claim 1 wherein bottom surfaces defining the grooves are concave in cross-section.

3. A reflector as in claim 2 wherein these concave shapes are formed by circular curves.

4. A reflector as in claim 2 wherein these concave shapes are formed by flat surfaces arranged in a V-shape.

5. A reflector as in claim 1 wherein bottom surfaces defining the grooves extend in acute angles to a relatively-flat main body of the flattened section.

6. A reflector as in claim 5 wherein the pointed angle $\alpha$ for each bottom surface is opened, or acute, in a direction of a nearest side edge of the flattened section.

7. A reflector as in claim 1 wherein most of bottom surfaces defining the grooves lie approximately, in a plane.

8. A reflector as in claim 1 wherein bottom surfaces defining the grooves in a central portion of the flattened section are at pointed angles in cross-section to a main body of the flattened section while in side portions of the flattened section they are concave in cross-section.

9. A reflector as in claim 1 wherein the grooves are formed by ribs which are formed on the flattened sections.

10. A reflector as in claim 9 wherein apex surfaces of the ribs are convex in cross-section.

11. A reflector as in claim 10 wherein the convex apex surfaces are circularly curved in cross-section.

12. A reflector as in claim 1 wherein the ratio of the depth to the breadth is 2:1.

13. A reflector as in claim 1 wherein bottom surfaces of the grooves extend approximately parallel to an approximately flat main body of the flattened section.

14. A reflector as in claim 1 wherein the grooves of the flattened section have various different shapes.

* * * * *